Figure 1:
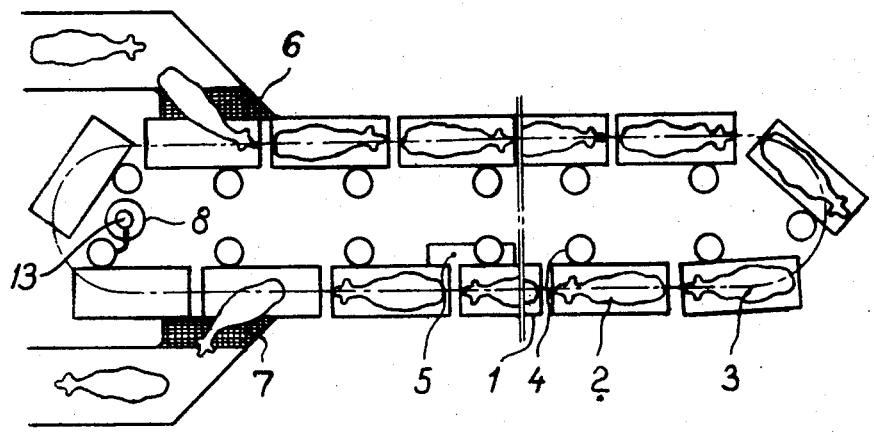

United States Patent

Strom

[15] 3,699,923
[45] Oct. 24, 1972

[54] MILKING SYSTEM
[72] Inventor: Sven O. E. Strom, Huddinge, Sweden
[73] Assignee: Alfa-Laval AB, Tumba, Sweden
[22] Filed: May 7, 1971
[21] Appl. No.: 141,267

[30] Foreign Application Priority Data

May 8, 1970 Sweden ..................6348/70

[52] U.S. Cl..............................119/14.04, 119/14.08
[51] Int. Cl..............................................A01j 09/00
[58] Field of Search..............119/14.04, 14.08, 14.11

[56] References Cited

UNITED STATES PATENTS

| | | | |
|---|---|---|---|
| 1,959,716 | 5/1934 | Hapgood | 119/14.04 |
| 2,305,259 | 12/1942 | Jeffers | 119/14.04 |
| 2,316,065 | 4/1943 | Hapgood | 119/14.04 |

*Primary Examiner*—Hugh R. Chamblee
*Attorney*—Davis, Hoxie, Faithfull & Hapgood

[57] ABSTRACT

Milking platforms for respective cows are each provided with a teat cup cluster of milk receiving vessel hermetically connected to the cluster, the platforms being movable in unison along a closed path or circuit while the cows are being milked to supply the respective receiving vessels. The platforms move successively past an emptying station comprising a pipeline swingable about the center of an arcuate portion of the closed path. As each platform arrives at the emptying station, the outlet of the corresponding receiving vessel is hermetically connected to the inlet of the swingable pipeline, and thereafter the vessel is emptied through this pipeline while it swings during movement of the platform along the arcuate portion of the path, the pipeline then being swung back to its initial position in preparation for emptying the vessel on the next platform.

3 Claims, 3 Drawing Figures

PATENTED OCT 24 1972

3,699,923

SHEET 1 OF 2

INVENTOR.
SVEN OLOF ERIK STROM

MILKING SYSTEM

This invention relates to milking systems of the type having a series of platforms movable through a closed path or circuit and each provided with a teat cup cluster and a milk receiving vessel for use in machine-milking a cow on the platform as it moves. More particularly, the invention relates to such a system having improved means for emptying each milk receiving vessel as the corresponding platform moves past an emptying station.

According to one known milking system, the milker attendant must apply the teat cup clusters to and remove them from cows in respective stationary stalls, so that he is forced to move between the stalls. In such case, he can milk 35 to 45 cows per hour. This system has the advantage that the milk can be conveyed through stationary pipelines in a closed system (i.e., without contacting the outer atmosphere) from the cow udder to a collection and cooling tank for the milk. Thus, the system affords good milk hygiene.

According to another prior system, the cows are moved on cars past the milker attendant so that he can apply and remove the teat cup clusters without moving to different locations. With this system, he can milk about 120 to 180 cows per hour. Thus, from the point of view of labor costs, the latter system is appreciably more advantageous than the former system. However, the latter system as made heretofore has the disadvantage that it does not enable the milk to be conveyed in a closed system from the cow udder to the collection tank. Instead, it has been necessary to allow the milk from each cow to discharge into an open receiving container before the milk can flow further to the collection tank.

The principal object of the present invention is to provide the latter system with an arrangement for conveying the milk in a closed system from the udder to the collection tank.

The present invention utilizes a system disclosed in U.S. Pat. No. 1,787,152 dated Dec. 30, 1930, and which comprises a row of milking platforms each intended for a cow and each provided with a teat cup cluster and a milk receiving vessel hermetically connected to the cluster. The system of said patent also comprises means for moving the milking platforms, during the milking, along a path which leads them successively, after the milking, past an emptying station for the milk, the inlet of the emptying station being a pipeline arranged to move with the receiving vessel during the emptying operation and to return to its starting position after disconnection from the vessel.

According to the present invention, the aforesaid pipeline is swingable about the center of an arc of a circle, this arc forming part of the path along which the milking platforms move, and the pipeline is adapted to be hermetically connected to the outlet of a milk receiving vessel when the corresponding platform arrives at the emptying station. This makes it possible for the pipeline and receiving vessel to move together without relative movement during the milk emptying operation along part of the movement path of the milking platforms, whereby the receiving vessel can be connected hermetically to the emptying station during the emptying operation.

During the emptying operation, vacuum is used in a conventional way for the discharge of the receiving vessel. When the vessel outlet and the inlet of the pipeline are connected together, this vacuum contributes to the connecting effect. However, the vacuum in itself is not sufficient to this end, and for this reason the invention provides a mechanism, such as a compressed air cylinder, for keeping the vessel outlet and the inlet of the pipeline pressed against each other during the emptying operation. The same mechanism can also be used for effecting the movements necessary to bring these parts together initially and to disconnect them.

If the milker attendant, when inspecting a receiving vessel, finds that the milk from an individual cow is defective, this milk, according to the invention, can be diverted separately through a branch pipeline connected to the emptying station.

Figure 2:
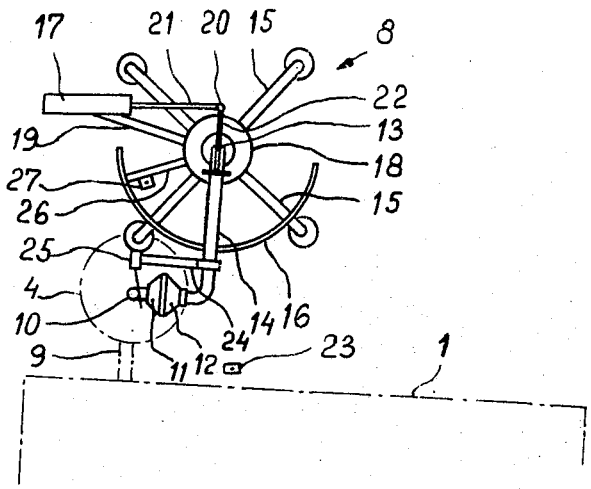
Figure 3:
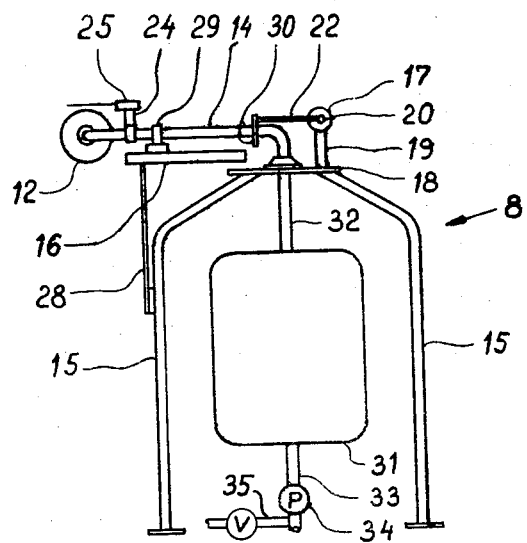

The invention is described more in detail below, reference being had to the accompanying drawings in which:

FIG. 1 is a schematic plan view of a row of milking platforms movable in a circuit, FIG. 2 is a plan view of an emptying station, arranged at the left-hand end of FIG. 1, and FIG. 3 is an elevational view of the same emptying station, seen from the right in FIG. 2.

Referring to FIG. 1, a plurality of milking platforms consists of cars 1, each one conveying a cow 2 along a path 3 shown by a dash-dotted line and forming a closed elongated circuit, with each end in the form of an arc of a circle. Each car supports a milk receiving vessel 4 and a conventional teat cup cluster (not shown). The latter as well as the vessel 4 are provided with the necessary vacuum by means of a vacuum pipeline and a vacuum pump, which accompany the car in its movement, and the pump is driven by an electric motor which is provided with current by means of a current rail arranged along the path, these details being omitted in FIG. 1. The cars are driven along the path by any suitable means indicated at 5. The cows get into the cars via a stationary platform 6 and get out of the cars via a stationary platform 7. The milker attendant stands at the left-hand end of the path and applies the teat cup clusters to the cows when they get into the cars and removes the teat cup clusters from the cows as they return to the left-hand end of the path after having been milked. The emptying station is indicated generally at 8 and is shown more in detail in FIGS. 2 and 3.

In FIG. 2, the contour-lines of a car 1 with the appurtenant milk receiving vessel 4 are shown by dash-dotted line. The vessel 4 is supported on the car by means of an arm 9. An outlet pipe 10 extends in the downward direction from the bottom of the vessel 4. The pipe 10 has at its lower end a horizontal part bent at right angles and carrying a conical outlet nozzle 11. The latter is provided with a rubber seal (not shown) and fits into a corresponding conical inlet nozzle 12 on a pipe-like arm 14 swingable about the center 13 of the left-hand arcuate portion of the path 3. The arm 14 is pivoted in a frame comprising four legs 15 fixed to the floor. The arm 14 is supported, during its swinging, by a stationary semicircular rail 16 and is swung by a piston driven by compressed air and operating in a cylinder 17. A round disc 18 is fixed to the tops of the legs 15 and carries an arm 19, which in turn carries the cylinder 17. The piston actuates the arm 14 through a linkage comprising a pair of arms 21 and 22 pivotally connected to each other at the point 20. A stationary sensing means is indicated at 23 and has an upwardly directed vertical feeler which is actuated when the supporting arm 9 of a milk receiving vessel 4 passes it. An arm 24, fixed to the arm 14, carries another sensing means 25 having a horizontal feeler which is actuated when, due to the movement of the arm 14, it strikes against the vertical pipe 10. An arm 26, carried by the disc 18, supports a sensing means 27 having a feeler directed vertically upward and which is actuated when the arm 14 strikes against it. The different sensing means are of the electric switch type operated by the feelers.

The representation of the emptying station is completed in FIG. 3, which shows a vertical arm 28 fixed to a leg 15 and supporting the rail 16. A runner 29 (not shown in FIG. 2) is guided by trundles in its movement along the upper edge of the rail 16 and carries the free end of the arm 14. The arm 22 actuates a flange 30 surrounding the arm 14. A weighing vessel 31 is interposed between the legs 15. For the sake of simplicity, the balance itself is not shown. A connecting pipeline between the arm 14 and the vessel 31 is shown at 32, and an outlet from the vessel 31 is shown at 33. A pump 34 is located in the outlet 33 and pumps the milk in the vessel 31 to a collection tank.

After a cow has been milked in the manner previously described, the milk delivered by the cow is contained in the vessel 4 under vacuum. When an arm 9 passes the sensing means 23, the latter gives a signal to the cylinder 17 which then, by means of the lever system 20–22, swings the arm 14 clockwise from its starting position into abutment against the nozzle 11. The abutment pressure is then kept so strong that the nozzles 11 and 12 seal sufficiently against each other, due to the continued action of cylinder 17 which causes arm 14 to accompany the nozzle 11 in the continued movement of the vessel 4. When, during the movement of the arm 14, the feeler of the sensing means 25 strikes the pipe 10, valves (not shown) are actuated so that the vessel 31 is put under vacuum and the vessel 4 under atmospheric pressure. The milk in the vessel 4 is then within a few seconds sucked down into the vessel 31, where it is weighed. When the feeler of the sensing means 27 is struck by the arm 14 during the further movement of the latter, the sensing means gives a signal to the cylinder 17, which then swings the arm 14 back to its starting position. During this reverse swinging, the feeler of the sensing means 25 loses its contact with the pipe 10, whereby said valves are actuated so that the vessel 31 is put under atmospheric pressure and the vessel 4 under vacuum. The milk is then pumped by the pump 34 from the vessel 31 to a collection tank (not shown).

If the milker attendant finds, when inspecting a vessel 4, that the milk is defective, he can manually attend to sending the milk in this vessel, while departing from the automatic operation, to a separate container via a separate valved pipeline 35 branching from the pipeline 33.

I claim:

1. A milking system comprising a row of milking platforms each operable to transport a cow thereon,
   a milk receiving vessel carried by each platform and adapted for connection to a teat cup cluster for delivering milk from the cow to said vessel,
   each said vessel having an outlet means defining a path for said platforms,
   said path including a first portion along which said platforms are movable while the cows thereon are being milked to effect said delivery to the corresponding vessels,
   said path also including a second portion in the form of an arc of a circle and along which the platforms are movable after said milking, and
   an emptying station past which the platforms are movable successively and which includes a pipeline swingable about the center of said arc and having an inlet adapted for hermetic connection to said outlet of a vessel for emptying the same during movement of the corresponding platform along said second portion of the path.

2. A milking system according to claim 1, in which the emptying station also includes mechanism for maintaining said pipeline inlet and vessel outlet pressed against each other during said emptying.

3. A milking system according to claim 1, in which said emptying station also includes a pipe communicating with said swingable pipeline for discharging milk from said station, and
   a pipe branching from said discharge pipe for diverting defective milk from said station.

* * * * *